F. MESINGER.
LINK BELT.
APPLICATION FILED SEPT. 23, 1921.
1,424,768.
Patented Aug. 8, 1922.
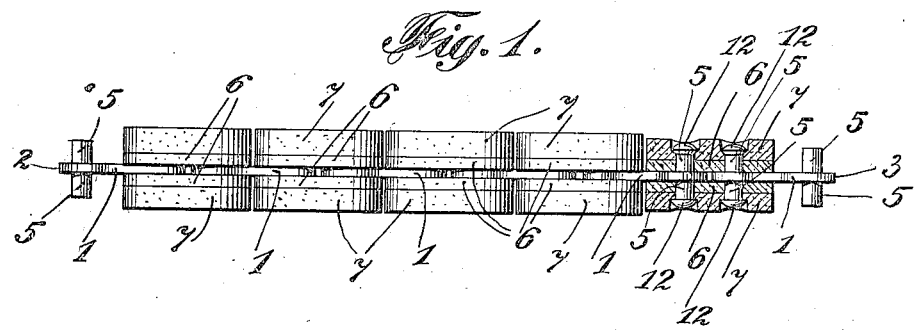
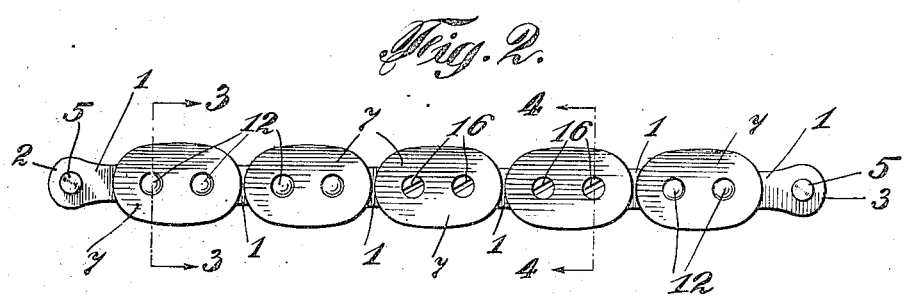
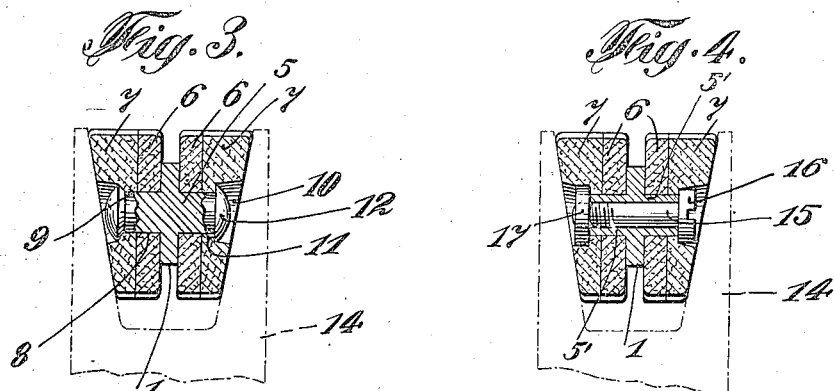
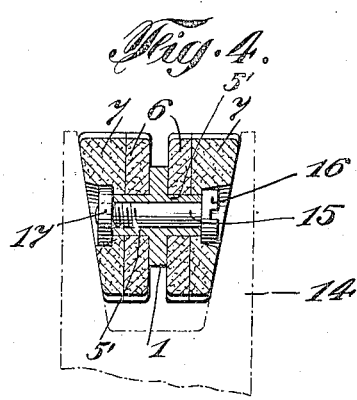
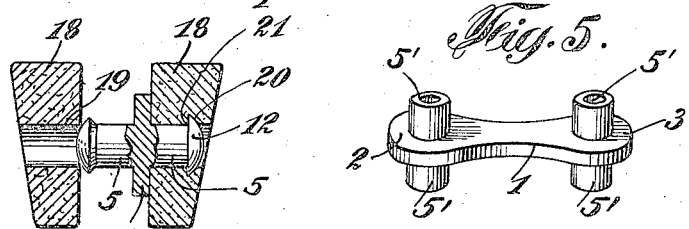
Inventor
F. Mesinger
By C. P. Goepel
his Attorney

UNITED STATES PATENT OFFICE.

FREDERICK MESINGER, OF NEW YORK, N. Y.

LINK BELT.

1,424,768.   Specification of Letters Patent.   Patented Aug. 8, 1922.

Application filed September 23, 1921. Serial No. 502,670.

*To all whom it may concern:*

Be it known that I, FREDERICK MESINGER, a citizen of the United States, and resident of New York city, borough of Bronx, county of Bronx, and State of New York, have invented certain new and useful Improvements in Link Belts, of which the following is a specification.

The present invention relates to improvements in link belts and has probably its widest application in connection with what are known as leather link belts for use in conjunction with the driving of air circulating fans and electric generators on motor vehicles, although it is of course understood that the device is not restricted to these uses but may be employed wherever a belt drive of this character is desirable or necessary.

An object of the invention is to provide for the pivoting of the links upon one another and the securing of the link parts together by a common agency and furthermore in the simple and inexpensive securing together of laminated leather outer links to metallic inner links which are concealed within the outer links and impart strength to the belt.

Another object of the invention resides in the provision of a motor driven belt composed of interconnected links preferably secured together permanently, with the exception that one or more links in the belt are so inserted as to permit of ready detachment and removal from the link train when the belt develops slackness.

A further object of the invention lies in providing an improved belt structure in which the inner metallic links are provided with integral bearing bosses which provide pivotal connections between adjacent and outer leather links of the belt structure.

The present invention likewise comprehends an improved method of assembling the outer link members of the belt in interconnected relation with the inner link members.

With the foregoing and other objects in view, the invention will be more fully described hereinafter in conjunction with the accompanying drawings, wherein like reference characters refer to like or corresponding parts throughout the several views, and in which:

Figure 1 is a fragmentary top edge view of a belt constructed according to the present invention and with parts shown in section:

Figure 2 is a fragmentary side view of such belt;

Figure 3 is a cross sectional view taken on the line 3—3 in Figure 2;

Figure 4 is a similar view on the line 4—4 also of Figure 2;

Figure 5 is a perspective view of one of the inner links, and

Figure 6 is a cross sectional view showing a slight modification in the outer links and the method of assembling the links.

Referring more particularly to the drawing, 1 designates the inner links which are preferably of metal of requisite length and thickness to afford the necessary strength and rigidity, the intermediate portions of the link being relatively narrow and the ends thereof comparatively wide as indicated at 2 and 3. From the opposite sides of these end portions of each inner metal link the solid metal bosses 5, integral with the link body, project substantially at right angles to the longitudinal axes of the link. These bosses are cylindrical in form and the oppositely projecting bosses at each end of the link preferably have their axes disposed in coinciding relation.

The outer link members which are connected by the inner metal links just described, in one embodiment of my invention are of laminated form and preferably include inner sections 6 of fibre or other suitable wear-resisting material and outer relatively thick sections 7 of leather or other suitable frictional material. These sections 6 and 7 of the outer link members are of the same size and shape, and when assembled, the peripheral faces thereof are flush.

The relatively thin inner sections 6 of the outer links are provided at their ends with openings 8 of such diameter that they may be snugly fitted about the bosses 5 of the inner metal links to pivot thereon. The outer thicker sections 7 are likewise provided with openings 9 which, at one of their ends are of the same diameter as the openings 8 in the section 6 and also fit snugly about the bosses 5. The remaining portions of the openings 9 are of enlarged diameter to provide recesses 10 in the outer faces of the link section 7. These enlarged portions of the openings 9 also afford annular shoulders 11, the purpose of which will be presently stated.

The above description applies to the major portion of the belt and after assembling the sections 6 and 7 of the outer link members upon the solid bosses 5 of the inner connecting metal links, the ends of said bosses are headed by means of a suitable tool or machine, the heads 12 as clearly shown in Figure 3 of the drawings being wholly contained within the recesses 10 in the outer sides of the link section 7. The flat inner faces of these heads extend over and upon the annular shoulders 11 and prevent relative movement of the link sections 6 and 7 longitudinally upon the bosses 5. This construction and manner of connection of the inner and outer link members of the belt affords a maximum of strength and security and yet permits of the free flexing of the belt or the relative pivotal movement of the inner and outer link members. The outer faces of the leather section 7 of the outer links are cut at an inclination or beveled so as to properly fit within the belt groove of a pulley 14 and frictionally engage the opposed diverging walls thereof.

Certain of the inner metal links other than those above described which are permanently connected to the outer links are provided with tubular bosses 5' as seen in Figure 4, the bores of said bosses being continued through the body of the link and connected to thereby form a passage or opening through which a bolt 15 may be inserted. One end of this bolt is provided with a head 16 adapted to abut against the end of one boss on the inner link and to overlap upon the shoulder 11 of the outer link section 7 while the other end of said bolt which projects beyond the end of the oppositely extending boss is threaded for engagement in the threaded opening of a suitable nut 17. This nut at its periphery is tightly held against turning movement by frictional engagement with the leather outer section 7 of the link. In Figure 2 of the drawings I have shown two of the outer links connected to the metal inner links of the above description but it will be understood that if desired, a greater number of the links can be thus constructed so that they may be readily disconnected and removed from the belt when it is necessary to take up slack therein or any desired number of such detachable or removable links inserted in order to lengthen the belt. If, after the belt has been used for some time, slackness develops, a screw driver may be applied to the bolt head 16 and the bolt unscrewed from its connection with the nut 17. One of the inner links may then be connected to another of the outer links to close the gap produced by the removal of a link. Where the belt is of great length a comparatively great number of removable links would probably be employed to take care of the increased slackness which would be apt to result from usage, but where the belt is shorter, two removable links are generally sufficient to provide for taking up the slack or increasing the length of the belt.

Referring more particularly to Figure 6, wherein I have shown a novel method of assembling the links, the outer links 18 are provided with openings 19 of substantially the same diameter as the bosses 5 whereby to be received over such bosses and to freely pivot thereon. The diameter of the openings 19 is uniform throughout and the outer link 18 being made of leather is susceptible of compression when the outer link is put in place as indicated at the right in Figure 6. The attachment is made by subsequently forcing the outer links 18 over the bosses and against the lateral faces of the inner links 1. This is accomplished by first securing alignment of the openings 19 in the outer links with the head 12 of the bosses and then applying pressure to force the outer links over upon the bosses, until the inner faces of such outer links abut against the outer side faces of the inner metallic links 1.

The final position of the outer links 18 will be substantially as shown at the right of Figures 6, the head 12 occupying a recess or annular socket formed in the leather adjoining the opening 19 by compression of the leather particles about the openings and head due to the enlarged character of the head as compared with the diameter of the opening. The recess 20 thus produced by the presence of the head 12 is also attended in its formation by the production of a shoulder 21 which engages beneath the abrupt inner wall of the head 12 and effectively co-operates with such head to hold the outer leather link in place and against accidental dislodgment. By the use of this method of assemblage, the time and expense required to impart the peculiar formation to the outer links 7 in the manner of the recess 10 and shoulder 11 in conjunction with the openings 9, is dispensed with and a simpler and less expensive structure is provided including one that will rest securely in place while admitting of a proper free pivoting movement.

In Figure 6 the outer links are shown to be in one piece at opposite sides of the inner link 1, or, in other words, such outer links are composed of two sections, one section on each side of an inner link.

While I have herein shown and described one practical and satisfactory form of the invention it is to be understood that the same is susceptible of many minor modifications in the form, proportion and relative arrangement of the several parts and I accordingly reserve the privilege of adopting all such legitimate changes as may be fairly embodied within the spirit and scope of the invention as claimed.

I claim:

1. A link belt comprising inner and outer link members, each of the inner link members having pivot bosses at its ends upon which the outer link members are loosely engaged, the pivot bosses of the majority of said inner link members being headed at their ends to inseparably retain the outer link members in assembled relation with said inner link members and removable means adapted to be engaged with the pivot bosses of the remaining inner link members and with the outer link members engaged upon said bosses to detachably retain said last-named inner and outer link members in assembled relation.

2. A link belt comprising a series of inner metallic links and outer link members of friction material adapted to be arranged upon opposite sides of the inner links and connected thereby, the majority of said inner links having means at their ends for detachably and inseparably connecting the adjacent outer link members to each other, the remaining inner link members having tubular pivot bosses projecting from their opposite side faces, and means adapted to be associated with said pivot bosses for removably retaining the outer link members thereon.

3. A link belt comprising inner links having bosses thereon and provided with enlarged heads at their outer ends, and outer links of compressible material having openings therein of substantially the same diameter as said bosses and adapted to be forced over said heads and pivotally received upon said bosses.

4. A link belt, comprising inner metal links provided at their ends with oppositely projecting hollow bosses, outer link members of friction material having openings to pivotally receive said bosses, said openings being enlarged at the outer sides of said link members to provide annular shoulders, and a fastening bolt extending through the communicating bosses and having heads at its opposite ends for engagement with the ends of the bosses and with the shoulders of the respective link members.

5. The herein described method of making and assembling belt links which consists in forming an inner link with a substantially cylindrical boss with an outer enlarged head, and in forcing over such enlarged head a compressible outer link having an opening of substantially the same diameter as said cylindrical boss and adapted to be received thereover and to pivot thereupon, said head adapted to compress the material of the outer link and to form therein a recess and a shouldered portion to bind the outer link in association with the inner link.

In testimony that I claim the foregoing as my invention, and I have signed my name hereunder.

FREDERICK MESINGER.